United States Patent

Scherer et al.

[15] 3,681,376

[45] Aug. 1, 1972

[54] -N-HYDROXY-2-TRIFLUOROMETHYL BENZIMIDAZOLES AND CARBAMIC ESTERS THEREOF

[72] Inventors: Otto Scherer, Bad Soden/Taunus; Hans Rochling, Konigstein/Taunus, both of Germany

[73] Assignee: Farbwerke Hoechet Aktiengessellschaft vormals Meister Lucius & Bruning, Frankfurt/Main, Germany

[22] Filed: June 16, 1969

[21] Appl. No.: 833,762

[30] Foreign Application Priority Data

June 19, 1968 Germany.............P 17 70 658.0

[52] U.S. Cl..................260/309.2, 71/92, 260/562 B
[51] Int. Cl. ............................................C07d 49/38
[58] Field of Search...................................260/309.2

[56] References Cited

UNITED STATES PATENTS

| | | | |
|---|---|---|---|
| 1,915,334 | 6/1933 | Salzberg et al. | 260/243 |
| 2,075,359 | 3/1937 | Salzberg et al. | 424/250 |
| 3,429,890 | 2/1969 | Sletzinger et al. | 260/309.2 |
| 3,528,798 | 9/1970 | Pfeiffer | 260/309.2 |

OTHER PUBLICATIONS

Chemical Abstracts, Vol. 31; 1406 (1937) Fries et al.
Synthetic Organic Chemistry, Wagner et al., N.Y., John Wiley & Sons (1953), page 645

*Primary Examiner*—Henry R. Jiles
*Assistant Examiner*—S. D. Winters
*Attorney*—Curtis, Morris & Safford

[57] ABSTRACT

The present invention is concerned with new N-hydroxy benzimidazoles and their use as herbicidally active compounds.

26 Claims, No Drawings

N-HYDROXY-2-TRIFLUOROMETHYL BENZIMIDAZOLES AND CARBAMIC ESTERS THEREOF

The present invention relates to substituted derivatives of N-hydroxy-benzimidazoles corresponding to formula I

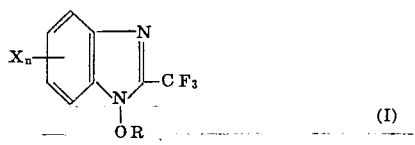

wherein X may designate identical or different substituents and represents hydrogen, chlorine or bromine, a nitro- or an amino group, n represents a whole number from 1 to 4, and R represents hydrogen or a carbamoyl radical

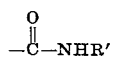

wherein R' represents an alkyl radical containing one to four carbon atoms or the phenyl radical.

The present invention also relates to a process for preparing the derivatives of N-hydroxy-benzimidazole corresponding to formula I, which comprises reducing correspondingly substituted o-nitro-trifluoroacetanilides corresponding to formula II

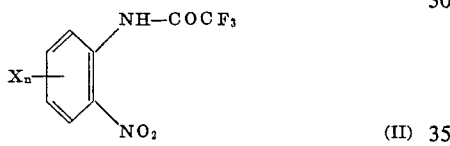

either catalytically in an acid medium with hydrogen or in an alkaline medium with an inorganic reducing agent and, if necessary, reacting the product so obtained in an inert solvent with an isocyanate of the formula $R'N = C = O$, wherein R' represents an alkyl radical containing one to four carbon atoms or the phenyl radical.

The substituted o-nitro-trifluoroacetanilides used as starting materials are obtained by trifluoroacetylation of the corresponding o-nitroanilines (cf. V.S. Kuznetsov and L.S. Efros, Journal of Org. Chem., USSR, vol. 1, No. 8, page 1482 (1965)).

The derivatives of N-hydroxy-benzimidazole corresponding to formula I, wherein R represents hydrogen, are prepared by partial reduction of correspondingly substituted o-nitrotrifluoroacetanilides corresponding to formula II, in an acid or alkaline medium according to formula

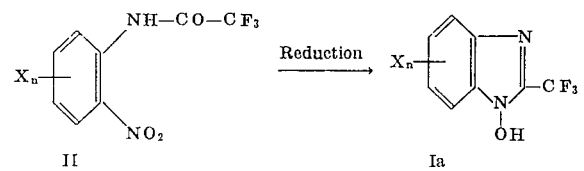

The reduction in an acid medium is carried out under normal pressure with hydrogen gas in the presence of catalysts which are derived from platinum, palladium or ruthenium, however, preferably in the presence of platinum oxide (confer, however, J. of Heterocyclic Chem., vol. 3, No.1, page 51 (1966) where, in the case of a similar compound, the operation is carried out under pressure and under acid reduction conditions).

In the aforesaid process there are used polar solvents such as methanol, ethanol, propanol, butanol, cyclohexanol, acetone, methyl ethyl ketone, dioxane, tetrahydrofuran, chlorobenzene and other solvents in which about 1 to 8 grams of gaseous hydrogen chloride are dissolved in 100 ml of the solvent. There is used such an amount of solvent containing HCl that there is present 1 to about four times the molar quantity of hydrogen chloride. The reaction temperature in this process lies within the range of from 10° to 120° C., preferably 18° to 60° C.

The substituted o-nitroanilines of formula II may also be reduced in an alkaline medium to yield the compounds of formula I a described above by dissolving them in 10 to 40 times the amount by weight of an aqueous sodium hydroxide solution of about 5 to 20 percent strength and reducing them by adding 1 to 8 times the molar quantity of an inorganic reducing agent, for example sodium dithionate, furthermore sodium thiosulfate, sodium sulfide or sodium sulfite. The reaction temperature in this process lies within the range of from 15° to 100° C., preferably 40° to 60° C.

By acidifying the reaction mixture with mineral acids, for example concentrated aqueous hydrochloric acid or sulfuric acid, to a pH of about 4 – 2, while cooling, the reaction product is precipitated from the solution.

The derivatives of N-hydroxy-benzimidazole corresponding to formula I, wherein R represents hydrogen, may be in the tautomeric equilibrium to the N-oxide form:

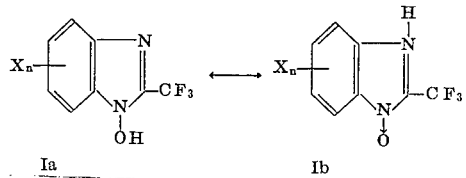

In the case of substitution reactions, it is preferably the I a form which reacts.

The derivatives of N-hydroxy-benzimidazole corresponding to formula I, wherein R represents a carbamoyl radical, may be considered N-carbamic acid esters. They are obtained by converting N-hydroxy-benzimidazoles corresponding to formula I a with 1 to 3 times the molar quantity of isocyanates corresponding to formula III:

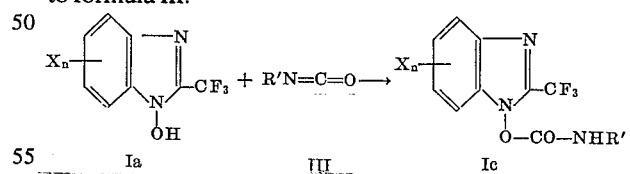

R' may represent an alkyl group containing from one to four carbon atoms or the phenyl radical. As solvents to be employed in this reaction there may be used all conventional solvents which are inert under the reaction conditions, for example benzene, toluene, chlorobenzene, cyclohexanone, ligroin or diethyl ether.

The reaction proceeds at temperatures within the range of from about 20° to 130° C., preferably 20° to 35° C.; the reaction lasts about 5 to 60 hours.

Owing to their CO frequency at 1780 cm⁻¹ in the infrared spectrum, the reaction products obtained in this manner show an ester structure.

The present invention furthermore provides herbicidal compositions comprising as active ingredient a derivative of N-hydroxy-benzimidazole corresponding to formula I.

It is known that 2-trifluoromethyl-benzimidazoles possess herbicidal properties (cf. British Pat. No. Spec. 1,015,937, French Pat. Nos. 1,426,887 and 1,430,139); however, the derivatives of N-hydroxy-benzimidazole possess, in addition to a herbicidal property which is superior in many cases, a lesser toxicity to warm-blooded animals than the corresponding hitherto known derivatives of benzimidazole.

The lesser toxicity of the compounds of the invention to warm-blooded animals is shown in the following comparison:

| | | $LD_{50}$ in rats (mg./kg.) administered orally |
|---|---|---|
| 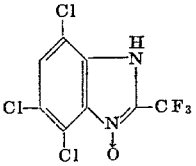 | According to the invention. | 130 |
| 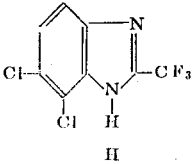 | Known product | [1] 70 to 80 |
| 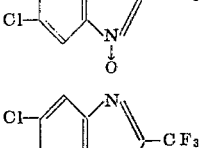 | According to the invention. | 208 |
|  | Known product | [1] 120 |

[1] D. E. Burton, A. J. Lambie, J. C. Ludgate, G. T. Newbold, A. Percival, O. T. Saggers, Nature, vol. 208, 1166(1965).

The derivatives of N-hydroxy-benzimidazole of the invention may be prepared in the form of the conventional compositions with the use of solid or liquid inert carriers, adhesives, wetting- and dispersing agents as well as grinding auxiliaries in the form of wettable powders, emulsion concentrates, suspensions, dusting powders or granules. They may be mixed with other insecticides, fungicides, nematicides, herbicides or also with fertilizers.

As carriers there may be used: mineral substances such as aluminum silicated (silitines, attapulgite), alumina ("Attaclay" (R)), kaolin, chalks, siliceous chalks, talc, kieselguhr or hydrated silicic acids or preparations of these mineral substances with special additives, for example chalc greased with sodium stearate, furthermore all conventional organic solvents, for example toluene, xylene, diacetone alcohol, isophorone, benzines, white oils, dioxane, dimethyl formamide, dimethyl sulfoxide, ethyl acetate, tetrahydrofurane, chlorobenzene.

As adhesives there may be used: cellulose products (glue) or polyvinyl alcohols.

As wetting agents there may be used: all suitable emulsifiers such as hydroxyethylated alkyl phenols, salts of aryl- or alkylaryl sulfonic acids, salts of methyl taurine, salts of sulfonic acids of saturated aliphatic hydrocarbons carrying a phenyl group, which hydrocarbons have been obtained by the Fischer-Tropsch synthesis, and soaps.

As dispersing agents there may be used: cellulose pitch (salts of sulfite spent liquors) and salts of naphthalene sulfonic acid and, possible, hydrated silicic acids or kieselguhr.

As grinding auxiliaries there may be used: suitable inorganic or organic salts such as sodium sulfate, ammonium sulfate, sodium carbonate, sodium hydrocarbonate, sodium thiosulfate, sodium stearate, sodium acetate.

The compounds of the invention can be used in combination with the following known herbicides enumerated by way of example:

| | |
|---|---|
| urea derivatives | linuron, chloroxuron, monolinuron, fluometuron, diuron |
| triazine derivatives | simazin, atrazin, ametryn, prometryn, desmetryn, methoprotryn |
| urazil derivatives | lenacil, bromacil |
| pyrazone derivatives | 1-phenyl-4-amino-5-chloro-pyridazone (6) (PCA) |
| growth promoting preparations | 2,4-dichlorophenoxy-acetic acid (2,4-D), 4-chloro-2-methylphenoxy-acetic acid (MCPA), 2,4,5-trichlorophenoxy-acetic acid (2,4,5-T), 4-chloro-2-methylphenoxy-butyric acid (MCPB), 2,3,6-trichlorobenzoic acid (TBA) |
| carbamic acid derivatives | barban, phenmedipham, triallate, diallate, vernolate and 2-chloro-allyl-N,N-diethyl-dithiocarbamate (CDEC) |
| dinitrophenol derivatives | dinitro-orthocresol (DNOC), dinitro-sec. butylphenol (DNBP), dinoseb-acetate |
| chlorinated aliphatic acids amides | trichloroacetic acid, dalapon diphenamide, N,N-diallyl-chloroacetamide (CDAA) |
| dipyridilium compounds anilides | paraquat, diquat, morfamquat N-(3,4-dichlorophenyl)-methacryl amide (DCMA), propanil, solan, monalide |
| nitriles | dichlobenil, ioxynil |
| other preparations | flurenol |

When the active ingredients according to the invention are mixed with fertilizers, preparations are obtained which simultaneously have a fertilizing and herbicidal effect.

The following Examples serve to illustrate the invention but they are not intended to limit it thereto:

EXAMPLE 1

A: 1-N-hydroxy-2-trifluoromethyl-4,6-dichloro-benzimidazole 30.5 g (0.1 mole) of 2,4-dichloro-6-nitro-trifluoroacetanilide were dissolved in 500 ml of anhydrous ethanol, 100 ml of ethanolic hydrochloric acid (2.16 moles HCl/1000 ml ethanol) and 500 mg of platinum oxide were added to the solution, and the reaction mixture was hydrogenated in the shaking device with hydrogen gas at 25° to 28° C. After a hydrogen absorption of 4,500 ml the reaction was complete. The reaction mixture was filtered off from the catalyst, the filtrate was concentrated in vacuo, and the residue was treated twice with 350 ml of boiling benzine (30° – 85° C.), respectively. Colorless crystals formed which were separated and dried. Yield: 23 g (85 percent of the theoretical yield)
Flow point: 194° C. (decomposition)
Analysis: $C_8H_3N_2Cl_2F_3O$ (271)

| | | | | |
|---|---|---|---|---|
| Calculated: | 35.4 % C | 1.1 % H | 10.32 % N | 26.2 % Cl |
| Found: | 35.5 % C | 1.1 % H | 10.9 % N | 16.8 % Cl |

EXAMPLE 2

B: 1-N-hydroxy-2-trifluoromethyl-5,6-dichlorobenzimidazole 45.45 g (0.15 mole) of 3,4-dichloro-6-nitro-trifluoroacetanilide were dissolved in 850 ml of anhydrous ethanol, 150 ml of ethanolic hydrochloric acid (2.16 moles HCl/1,000 ml ethanol) and 500 mg of platinum oxide were added to the solution and the reaction mixture was hydrogenated in the shaking device with hydrogen gas at 25° C. After a hydrogen absorption of 7,000 ml the reaction was complete. The reaction mixture was filtered off from the catalyst, the filtrate was concentrated in vacuo, the residue was dissolved in 1,800 ml of toluene, the solution was warmed up to 90° C. and a current of nitrogen was passed through the solution until no more surplus hydrogen chloride escaped. Then the solution was filtered off and petroleum ether (80° – 100° C.) was added thereto until turbidity occurred. After cooling, the precipitated solid material was filtered off with suction, washed with petroleum ether (80°– 100° C.) and dried. Yield: 31 g (86 percent of the theoretical yield)
Flow point : 196° C. (decomposition)
Analysis: $C_8H_3N_2Cl_2F_3O$ (271)

| | | | | |
|---|---|---|---|---|
| Calculated | 35.4 % C | 1.1 % H | 26.2 % Cl | 10.32 % N |
| Found: | 35.0 % C | 1.1 % H | 26.1 % Cl | 10.5 % N |

EXAMPLE 3

C: 1N-hydroxy-2-trifluoromethyl-4,6,7-trichlorobenzimidazole 612 g (1.81 moles) of 2,4,5-trichloro-6-nitro-trifluoroacetanilide were dissolved in 15,000 ml of an aqueous sodium hydroxide solution of 10 percent strength. At 50° C., 1.5 kg (8.6 moles) of sodium dithionite were added to the solution during the course of 6 hours, while stirring. Then the reaction mixture was stirred 50° C. during the course of 16 hours. The reaction mixture was allowed to cool and it was acidified with concentrated sulfuric acid, while stirring and cooling with ice, until a pH of 2 was attained. The precipitate which had formed was separated, washed with water until the wash water had a neutral reaction and dried.
Yield: 348 g (63.4 percent of the theoretical yield)
Flow point: 205° C. (decomposition)
Analysis: $C_8H_2N_2Cl_3F_3O$ (305.5)

| | | | |
|---|---|---|---|
| Calculated: | 31.4 % C | 0.65 % H | 9.16 % N |
| Found: | 31.7 % C | 1.0 % H | 9.0 % N |

EXAMPLE 4

D: 1-N-hydroxy-2-trifluoromethyl-5,6,7-trichlorobenzimidazole 36.8 g (0.1 mole) of 3,4,5-trichloro-6-nitro-trifluoroacetanilide were dissolved in 750 ml of anhydrous ethanol, 100 ml of ethanolic hydrochloric acid (2.16 moles HCl/1,000 ml ethanol) and 500 mg of platinum oxide were added to the solution and the reaction mixture was hydrogenated in the shaking device with hydrogen gas at 28° C. After a hydrogen absorption of 4,800 ml the reaction was complete. The reaction mixture was filtered off from the catalyst and water was added to the filtrate until an oily precipitate had deposited which was separated and triturated with petroleum ether (80° – 110° C). The solid which had formed was washed with water until the wash water had a neutral reaction and dried. Yield: 20.6 g (69 percent of the theoretical yield)
Flow point: 163° C. (decomposition)
Analysis: $C_8H_2N_2Cl_3F_3O$ (305.5)

| | | | |
|---|---|---|---|
| Calculated: | 31.4 % C | 0.65 % H | 9.16 % N |
| Found: | 31.7 % C | 0.8 % H | 8.9 % N |

EXAMPLE 5

E: 1-N-hydroxy-2-trifluoromethyl-5-chloro-6-nitrobenzimidazole 62.6 g (0.2 mole) of 3-chloro-4,6-dinitro-trifluoroacetanilide were dissolved in 800 ml of anhydrous ethanol, 200 ml of ethanolic hydrochloric acid (2.16 moles HCl/1,000 ml ethanol) and 500 mg of platinum oxide were added to the solution and the reaction mixture was hydrogenated in the shaking device with hydrogen gas at 38° C. After a hydrogen absorption of 9,000 ml the reaction was complete. The reaction mixture was filtered off from the catalyst, the filtrate was concentrated in vacuo until a crystalline solid had formed which was recrystallized in ethanol/water and benzene/petroleum ether (80° – 110° C). Yield: 15 g (27 percent of the theoretical yield)
Flow point: 206° C.
Analysis: $C_8H_3N_3ClF_3O_3$ (281.5)

| | | | |
|---|---|---|---|
| Calculated: | 34.16 % C | 1.07 % H | 14.95 % N |
| Found: | 35.1 % C | 1.32 % H | 14.8 % N |

EXAMPLE 6

F: 1-N-hydroxy-2-trifluoromethyl-4amino-5,6,7-trichloro-benzimidazole 38.2 g (0.1 mole) of 2,6-dinitro-3,4,5-trichloro-trifluoroacetanilide were dissolved in 850 ml of anhydrous ethanol, 150 ml of ethanolic hydrochloric acid (2.16 moles HCl/1,000 ml ethanol) and 500 mg of platinum oxide were added to the solution and the reaction mixture was hydrogenated in the shaking device with hydrogen gas at 30° C. After a hydrogen absorption of 11,000 ml the reaction was complete. The reaction mixture was filtered off, the filtrate was concentrated in vacuo and the residue obtained was treated with petroleum ether (80° – 110° C). The solid which had formed was filtered off with suction and dried. Yield: 18 g (32 percent of the theoretical yield)
Flow point: 205° C. (decomposition)
Analysis: $C_8H_3N_3Cl_3F_3O$ (320.5)

| | | | | |
|---|---|---|---|---|
| Calculated | 29.95 % C | 0.93 % H | 13.1 % N | 33.3 % Cl |
| Found: | 30.1 % C | 0.9 % H | 13.2 % N | 32.2 % Cl |

The following N-hydroxy-2-trifluoromethyl-benzimidazoles can be prepared in an analogous manner by using the respective reactants:

1. 1-N-hydroxy-2-trifluoromethyl-6-chlorobenzimidazole having a melting point of 187° to 188° C.
2. 1-N-hydroxy-2-trifluoromethyl-5-chlorobenzimidazole having a melting point of 192° C.
3. 1-N-hydroxy-2-trifluoromethyl-4,6-dibromobenzimidazole having a melting point of 211° to 212° C
4. 1-N-hydroxy-2-trifluoromethyl-4,5,6,7-tetrachlorobenzimidazole.

EXAMPLE 7

G: N-methylcarbamic acid ester of 1-hydroxy-2-trifluoromethyl-4,6-dichloro-benzimidazole 33 g (0.12 mole) of 1-N-hydroxy-2-trifluoromethyl-4,6-dichlorobenzimidazole were dissolved in about 1,000 ml of anhydrous diethyl ether. 15 ml (0.24 mole) of methyl isocyanate were added to the solution and the whole was left for 48 hours at 23°C. Then the solvent was distilled off, the residue was triturated with n-hexane, filtered off and dried. Yield: 23 g (70 percent of the theoretical yield)
Flow point: 171° – 172° C. (decomposition)
Analysis: $C_{10}H_6N_3Cl_2F_3O_2$ (328)

| | | | |
|---|---|---|---|
| Calculated: | 36.6 % C | 1.86 % H | 12.8 % N |
| Found: | 36.3 % C | 1.9 % H | 13.0 % N |

The following carbamic esters of 1-hydroxy-2-trifluoro-methyl-benzimidazoles can be prepared in an analogous manner by using the respective reactants:

1. N-methyl carbamic ester of 1-hydroxy-2-trifluoromethyl-5,6,7-trichlorobenzimidazole having a melting point of 167° C. (decomposition),
2. N-phenyl carbamic ester of 1-hydroxy-2-trifluoromethyl-5-chloro-6-nitrobenzimidazole having a melting point of 138° C. (decomposition),
3. N-methyl carbamic ester of 1-hydroxy-2-trifluoromethyl-5-chloro-6-nitrobenzimidazole having a melting point of 171° C. (decomposition),
4. N-phenyl carbamic ester of 1-hydroxy-2-trifluoromethyl-4-chlorobenzimidazole having a melting point of 126° C. (decomposition),
5. N-methyl carbamic ester of 1-hydroxy-2-trifluoromethyl-5-chlorobenzimidazole having a melting point of 102° C. (decomposition),
6. N-phenyl carbamic ester of 1-hydroxy-2-trifluoromethyl-5,6-dichlorobenzimidazole having a melting point of 149° to 150° C.,
7. N-phenyl carbamic ester of 1-hydroxy-2-trifluoromethyl-4,6-dichlorobenzimidazole having a melting point of 139° – 140° C.,
8. N-methyl carbamic ester of 1-hydroxy-2-trifluoromethyl-4,5,6,7-tetrachlorobenzimidazole,
9. N-ethyl carbamic ester of 1-hydroxy-2-trifluoromethyl-4,6,7-trichlorobenzimidazole,
10. N-butyl carbamic ester of 1-hydroxy-2-trifluoromethyl-4,6,7-trichlorobenzimidazole.

EXAMPLE 8

H: N-methyl carbamic acid ester of 1-hydroxy-2-trifluoromethyl-5,6-dichlorobenzimidazole In a manner analogous to that described in Example 7, 29.8 g (0.11 mole) of 1-N-hydroxy-2-trifluoromethyl-5,6-dichlorobenzimidazole were converted with 12 ml (0.2 mole) of methyl isocyanate in anhydrous ether, and the product was worked up.
Yield: 29 g (81 % of the theoretical yield)
Flow point: 165° C.
Analysis: $C_{10}H_6N_3Cl_2F_3O_2$ (328)

| | | | |
|---|---|---|---|
| Calculated: | 36.6 % C | 1.86 % H | 12.8 % N |
| Found: | 36.7 % C | 1.7 % H | 12.7 % N |

EXAMPLE 9

J: N-methyl carbamic acid ester of 1-hydroxy-2-trifluoromethyl-4,6,7-trichloro-benzimidazole In a manner analogous to that described in Example 7, 35 g (0.11 mole) of 1-N-hydroxy-2-trifluoromethyl-4,6,7-trichlorobenzimidazole were converted with 13 ml (0.22 mole) of methyl isocyanate in anhydrous ether and the product was worked up.
Yield: 25 g (63 percent of the theoretical yield).
Flow point: 202° – 206° C. (decomposition)
Analysis $C_{10}H_5N_3Cl_3F_3O_2$ (362.5)

| | | | |
|---|---|---|---|
| Calculated: | 33.15 % C | 1.38 % H | 11.55 % N |
| Found: | 33.3 % C | 1.2 % H | 10.5 % N |

EXAMPLE 10

K: N-phenyl carbamic acid ester of 1-hydroxy-2-trifluoro-methyl-5,6,7-trichlorobenzimidazole 21 g (0.07 mole) of 1-N-hydroxy-2-trifluoromethyl-5,6,7-trichloro-benzimidazole were converted, as described in Example 7, in anhydrous ether with 17 ml (0.14 mole) of phenyl isocyanate and the product was worker up. Yield: 16.6 g (56 % of the theoretical yield)
Flow point: 174° C. (decomposition)
Analysis: $C_{15}H_7N_3Cl_3F_3O_2$ (424.5)

| | | | |
|---|---|---|---|
| Calculated: | 42.4 C | 1.65 H | 9.88 N |
| Found: | 43.8 C | 1.8 H | 10.2 N |

EXAMPLE 11

L: N-phenyl carbamic acid ester of 1-hydroxy-2-trifluoro-methyl-4,6-dibromobenzimidazole 27 g (0.075 mole) of 1-N-hydroxy-2-trifluoromethyl-4,6-dibromobenzimidazole were converted in anhydrous ether with 17.7 ml (0.15 mole) of phenyl isocyanate in a manner analogous to that described in Example 7.
Yield: 31.4 g (87 percent of the theoretical yield)
Flow point: 157° – 159° C. (decomposition)
Analysis: $C_{15}H_8N_3Br_2F_3O_2$ (479)

| | | | |
|---|---|---|---|
| Calculated: | 37.6 C | 1.67 H | 8.76 N |
| Found: | 38.0 C | 1.6 H | 8.7 N |

EXAMPLE 12

A variety of weeds and cultivated plants were sown in aluminum boxes filled with humous sandy loam. 3 weeks after the sowing, the plants were treated with formulations of wettable powders suspended in water of the following preparations:

A = 1-N-hydroxy-2-trifluoromethyl-4,6-dichlorobenzimidazole
B = 1-N-hydroxy-2-trifluoromethyl-5,6-dichlorobenzimidazole
C = 1-N-hydroxy-2-trifluoromethyl-4,6,7-trichlorobenzimidazole D = 1-N-hydroxy-2-trifluoromethyl-5,6,7-trichlorobenzimidazole E = 1-N-hydroxy-2-trifluoromethyl-5-chloro-6-nitrobenzimidazole F = 1-N-hydroxy-2-trifluoromethyl-4-amino-5,6,7-trichlorobenzimidazole G = N-methylcarbamic acid ester of 1-hydroxy-2-trifluoromethyl-4,6-dichlorobenzimidazole H = N-methyl carbamic acid ester of 1-hydroxy-2-trifluoromethyl-5,6-dichloro-benzimidazole J = N-methyl carbamic acid ester of 1-hydroxy-2-trifluoromethyl-4,6,7-trichlorobenzimidazole K = N-phenyl carbamic acid ester of 1-hydroxy-2-trifluoromethyl-5,6,7-trichlorobenzimidazole L = N-phenyl carbamic acid ester of 1-hydroxy-2-trifluoro-methyl-4,6-dibromobenzimidazole.

As comparative substance 2-trifluoromethyl-5,6-dichloro-benzimidazole was used.

The tests were evaluated two weeks after the treatment. The results obtained with concentrations of 1.25 and 2.5 kg of active ingredient per hectare are indicated in the Table following hereunder, wherein wild mustard (Sinapis arvensis) is given as a representative sample of dicotyledonous weeds (having two seed-leaves), whereas Eleusine indica is given as a representative sample of monocotyledonous weeds (having one seed-leaf).

Further dicotyledonous weeds tested were:

| German camomile | Matricaria chamomilla |
| chickweed | Stellaria media |
| portulaca | Portulaca oleracea |
| foxtail | Amaranthus retroflexus |

The degree of damage sustained by these types of weeds corresponded to that sustained by wild mustard; moreover, as another sample of a monocotyledonous weed, barnyard grass (Echinochloa crus-galli) was injured in a similar high degree as Eleusine indica.

TABLE

Effect on weeds and cultivated plants

| | Herbicidal effect as "Degree of damage in percent" | | | | Injury 2 cultivated plants | | | |
|---|---|---|---|---|---|---|---|---|
| | Sinapis arvensis | | Eleusine indica | | Maize | | Cotton | |
| Preparation | 2.5 | 1.25 | 2.5 | 1.25 | 2.5 | 1.25 | 2.5 | 1.25 |
| A | 100 | 95 | 75 | 60 | 0 | 0 | 0 | 0 |
| B | 100 | 95 | 90 | 80 | 0 | 0 | 0 | 0 |
| C | 100 | 100 | 100 | 95 | Slight | 0 | 0 | 0 |
| D | 100 | 100 | 100 | 100 | Slight | Slight | Slight | 0 |
| E | 100 | 95 | 70 | 40 | Slight | 0 | 0 | 0 |
| F | 100 | 100 | 95 | 90 | Slight | 0 | 0 | 0 |
| G | 100 | 100 | 85 | 60 | Slight | Slight | Slight | 0 |
| H | 100 | 100 | 90 | 70 | Slight | 0 | Slight | Slight |
| J | 100 | 100 | 95 | 80 | Slight | 0 | 0 | 0 |
| K | 100 | 95 | 90 | 80 | 0 | 0 | 0 | 0 |
| L | 100 | 95 | 95 | 80 | 0 | 0 | 0 | 0 |
| Comparative substance | 90 | 60 | 60 | 40 | Slight | 0 | 0 | 0 |

It can be seen from the Table that the claimed substances killed dicotyledonous weeds such as wild mustard on an average with concentrations of 2.5 kg of active ingredient per hectare, for the most part also with concentrations of 1.25 kg of active ingredient per hectare, while of the comparative substance more than 2.5 kg per hectare were required. Also the effect on Eleusine indica was distinctly superior to that shown by the comparative substance.

On the other hand, cultivated plants such as maize (Zea mays) or cotton (gossypium hirsutum) were injured by the novel compounds as well as by the comparative substance, when applied in a concentration of 2.5 kg per hectare, in a small degree only or not at all; with concentrations of 1.25 kg of active ingredient per hectare hardly any injuries were noticed.

All damages consisted of slight burnings of the foliage which had come into direct contact with the spray liquid; the foliage which grew afterwards developed quite normally.

Since for the use of a herbicide in a crop as high an interval as possible between damages sustained by weeds on the one hand and injuries sustained by or sparing of cultivated plants, on the other hand, is decisive, the foregoing statements show not only the distinctly superior herbicidal effect of the novel compounds but also a correspondingly improved tolerance to cultivated plants such as maize or cotton.

We claim:

1. An N-hydroxy-benzimidazole derivative of the formula

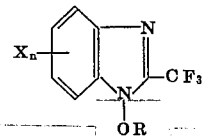

wherein X may designate identical or different substituents and represents hydrogen, chlorine or bromine, a nitro- or an amino group, n represents a whole number from 1 to 4, and R represents hydrogen or a carbamoyl radical

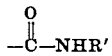

wherein R' represents an alkyl radical containing 1 to 4 carbon atoms or the phenyl radical.

2. 1-N-hydroxy-2-trifluoromethyl-4,6-dichlorobenzimidazole.

3. 1-N-hydroxy-2-trifluoromethyl-5,6-dichlorobenzimidazole.

4. 1-N-hydroxy-2-trifluoromethyl-4,6,7-trichlorobenzimidazole.

5. 1-N-hydroxy-2-trifluoromethyl-5,6,7-trichlorobenzimidazole.

6. 1-N-hydroxy-2-trifluoromethyl-5-chloro-6-nitrobenzimidazole.

7. 1-N-hydroxy-2-trifluoromethyl-4-amino-5,6,7-trichlorobenzimidazole.

8. 1-N-hydroxy-2-trifluoromethyl-6-chlorobenzimidazole.

9. 1-N-hydroxy-2-trifluoromethyl-5-chlorobenzimidazole.

10. 1-N-hydroxy-2-trifluoromethyl-4,6-dibromobenzimidazole.

11. 1-N-hydroxy-2-trifluoromethyl-4,5,6,7-tetrachlorobenzimidazole.

12. N-methyl carbamic ester of 1-hydroxy-2-trifluoromethyl-4,6-dichloro-benzimidazole.

13. N-methyl carbamic ester of 1-hydroxy-2-trifluoromethyl-5,6-dichlorobenzimidazole.

14. N-methyl carbamic ester of 1-hydroxy-2-trifluoromethyl-4,6,7-trichlorobenzimidazole.

15. N-phenyl carbamic ester of 1-hydroxy-2-trifluoromethyl-5,6,7-trichlorobenzimidazole.

16. N-phenyl carbamic ester of 1-hydroxy-2-trifluoromethyl-4,6-dibromobenzimidazole.

17. N-methyl carbamic ester of 1-hydroxy-2-trifluoromethyl-5,6,7-trichlorobenzimidazole.

18. N-phenyl carbamic ester of 1-hydroxy-2-trifluoromethyl-5-chloro-6-nitrobenzimidazole.

19. N-methyl carbamic ester of 1-hydroxy-2-trifluoromethyl-5-chloro-6-nitrobenzimidazole.

20. N-phenyl carbamic ester of 1-hydroxy-2-trifluoromethyl-4-chlorobenzimidazole.

21. N-methyl carbamic ester of 1-hydroxy-2-trifluoromethyl-5-chlorobenzimidazole.

22. N-phenyl carbamic ester of 1-hydroxy-2-trifluoromethyl-5,6-dichlorobenzimidazole.

23. N-phenyl carbamic ester of 1-hydroxy-2-trifluoromethyl-4,6-dichlorobenzimidazole.

24. N-methyl-carbamic ester of 1-hydroxy-2-trifluoromethyl-4,5,6,7-tetrachlorobenzimidazole.

25. N-ethyl carbamic ester of 1-hydroxy-2-trifluoromethyl-4,6,7-trichlorobenzimidazole.

26. N-butyl carbamic ester of 1-hydroxy-2-trifluoromethyl-4,6,7-trichlorobenzimidazole.

* * * * *